United States Patent
Seo

(10) Patent No.: US 10,728,955 B2
(45) Date of Patent: *Jul. 28, 2020

(54) METHOD FOR FORMING DYNAMIC BRIDGE NODE OF WIRELESS MESH NETWORK

(71) Applicant: SAMJIN LND CO., LTD, Hwaseong-si (KR)

(72) Inventor: EunSeok Seo, Seoul (KR)

(73) Assignee: SAMJIN LND CO., LTD., Hwaseong-si (KR)

( * ) Notice: Subject to any disclaimer, the term of this patent is extended or adjusted under 35 U.S.C. 154(b) by 255 days.

This patent is subject to a terminal disclaimer.

(21) Appl. No.: 15/755,632

(22) PCT Filed: Apr. 27, 2017

(86) PCT No.: PCT/KR2017/004483
§ 371 (c)(1),
(2) Date: Feb. 27, 2018

(87) PCT Pub. No.: WO2017/188748
PCT Pub. Date: Nov. 2, 2017

(65) Prior Publication Data
US 2018/0249535 A1    Aug. 30, 2018

(30) Foreign Application Priority Data
Apr. 27, 2016 (KR) .................. 10-2016-0051640

(51) Int. Cl.
*H04W 92/02* (2009.01)
*H04W 84/18* (2009.01)
(Continued)

(52) U.S. Cl.
CPC .......... *H04W 92/02* (2013.01); *H04W 40/02* (2013.01); *H04W 40/24* (2013.01); *H04W 48/18* (2013.01);
(Continued)

(58) Field of Classification Search
CPC ..... H04W 92/02; H04W 84/22; H04W 48/18; H04W 88/10; H04W 72/1252;
(Continued)

(56) References Cited

U.S. PATENT DOCUMENTS

| 9,936,567 B2 * | 4/2018 | Seo .................. H05B 33/0842 |
| 2011/0235636 A1 * | 9/2011 | Hsiu .................. H04L 12/18 370/390 |

(Continued)

FOREIGN PATENT DOCUMENTS

| JP | 2010-157838 A | 7/2010 |
| JP | 2010157838 A * | 7/2010 |

(Continued)

*Primary Examiner* — Justin T Van Roie
(74) *Attorney, Agent, or Firm* — Korus Patent, LLC; Seong Il Jeong

(57) ABSTRACT

A method for forming a dynamic bridge node of a wireless mesh network is provided. The method includes enabling a bridge mode of at least one of the mesh nodes in correspondence to a mutual coverage, when a signal corresponding to a connection source is received from the external network, transmitting, by the mesh node having the enabled bridge mode, rank information for connection to the external network with reference to a distance to the connection source and the mesh node's own traffic, comparing rank information received from a neighboring mesh node having an enabled bridge mode with the mesh node's own rank information, and generating an order of priority for connection to the external network. The mesh node with the highest order of priority operates as a bridge node for connection of the external network and the wireless mesh network.

5 Claims, 3 Drawing Sheets

(51) Int. Cl.
*H04W 48/18* (2009.01)
*H04W 84/22* (2009.01)
*H04W 40/24* (2009.01)
*H04W 40/02* (2009.01)
*H04W 72/06* (2009.01)
*H04W 72/12* (2009.01)
*H04W 88/10* (2009.01)

(52) U.S. Cl.
CPC ....... *H04W 72/06* (2013.01); *H04W 72/1247* (2013.01); *H04W 72/1252* (2013.01); *H04W 84/18* (2013.01); *H04W 84/22* (2013.01); *H04W 88/10* (2013.01); *Y02D 70/20* (2018.01); *Y02D 70/22* (2018.01); *Y02D 70/30* (2018.01)

(58) Field of Classification Search
CPC . H04W 72/1247; H04W 72/06; H04W 40/02; H04W 40/24; H04W 84/18; H04W 40/18; H04W 24/02; Y02D 70/22; Y02D 70/20; Y02D 70/30
See application file for complete search history.

(56) References Cited

U.S. PATENT DOCUMENTS

2015/0142714 A1* 5/2015 Golota .................... H04L 67/10
706/23
2015/0187209 A1* 7/2015 Brandt ................... G08C 19/00
340/12.22

FOREIGN PATENT DOCUMENTS

| KR | 10-2010-0126856 A | 12/2010 |
| KR | 10-1379217 B1 | 3/2014 |
| KR | 10-2014-0116161 A | 10/2014 |
| WO | 2015/200558 A1 | 12/2015 |

* cited by examiner

METHOD FOR FORMING DYNAMIC BRIDGE NODE OF WIRELESS MESH NETWORK

TECHNICAL FIELD

The present invention relates to a method for forming a dynamic bridge node of a wireless mesh network, and more particularly, a method for forming a dynamic bridge node of a wireless mesh network, in which a bridge node for connecting the wireless mesh network to an external network is dynamically and automatically configured.

BACKGROUND ART

Generally, a wireless mesh network is a technique in which fixed wireless routers are connected by multi-hop to form a single wireless backhaul network. A special type of one or more wireless routers called gateways are present in a wireless mesh network, and the gateway serves as a path for connecting a wireless router on the wireless mesh network to an external Internet network. In addition, each of the wireless routers provides a wireless communication service to lower mobile nodes to perform a function as a wireless backhaul network.

In terms of routing, the wireless mesh network configures a network with fixed wireless routers. Therefore, there is little change in a network topology, and ubiquitous wireless infrastructure can be built inexpensively and easily in a fixed space such as a school, a hospital, an office, and the like. The network topology is an arrangement layout of network and represents a method by which a plurality of devices are interconnected via a communication link.

On the other hand, in the wireless mesh network, all traffic is concentrated in the gateway, causing a network bottleneck. Therefore, in order to optimize the network performance and solve the routing problem of the entire network, the gateway is located at a specific position, or multiple gateways are installed.

However, if the gateway at a specific location fails to function in the conventional wireless mesh network due to a failure or the like, the wireless mesh network is blocked from accessing another network such as an Internet network, or the phase of the wireless mesh network is changed. Thus, the network performance may be degraded. For example, when a specific gateway fails in the wireless mesh network using multiple gateways, packet transmission using a routing path to the failed gateway may not be performed, or traffic of the failed gateway should be shared by other gateways.

In addition, the location of the gateway for connecting to the external network source is fixed in the conventional wireless mesh network. Thus, even if there is another source that enables connection to the external network in the wireless mesh network area, it cannot be used if a gateway for connecting to another source is not installed at that location.

DETAILED DESCRIPTION OF THE INVENTION

Technical Problem

The present invention has been made in an effort to solve the above-described problems.

It is another object of the present invention to provide a method for forming a dynamic bridge node of a wireless mesh network, which is capable of dynamically configuring a bridge node for connection to an external network, regardless of a location in the wireless mesh network.

It is another object of the present invention to provide a method for forming a dynamic bridge node of a wireless mesh network, which is capable of allowing connection to an external network, without setting a separate gateway, by the dynamic bridge node when an external network source connectable to the wireless mesh network is generated.

Technical Solution

In order to achieve the above-described objects of the present invention and realize the following characteristic effects of the present invention, a characteristic configuration of the present invention is provided as follows.

According to one embodiment of the present invention, a method for forming a dynamic bridge node for connection to an external network in a wireless mesh network configured by a plurality of mesh nodes includes: enabling a bridge mode of at least one of the mesh nodes in correspondence to a mutual coverage; when a signal corresponding to a connection source is received from the external network, transmitting, by the mesh node having the enabled bridge mode, rank information for connection to the external network with reference to a distance to the connection source and the mesh node's own traffic, comparing rank information received from a neighboring mesh node having an enabled bridge mode with the mesh node's own rank information, and generating an order of priority for connection to the external network; and when the generated order is not a highest order of priority, excluding the mesh node from the rank for connection to the external network, and when the generated order is the highest order of priority, operating the mesh node as a bridge node for connection of the external network and the wireless mesh network.

Advantageous Effects

According to the present invention, since a bridge node for connection to an external network of a wireless mesh network is dynamically formed, it is possible to maintain the performance of the mesh network in an optimum state, regardless of failure of equipment such as a gateway at a specific location.

In addition, according to the present invention, when an external network source connectable to the wireless mesh network is generated, automatic connection is achieved by the dynamic bridge node, thereby improving the performance of the network.

Furthermore, according to the present invention, since the bridge node for connection to the external network of the wireless mesh network is dynamically formed, the wireless mesh network can be easily designed and configured.

BEST MODE

Figure 1:
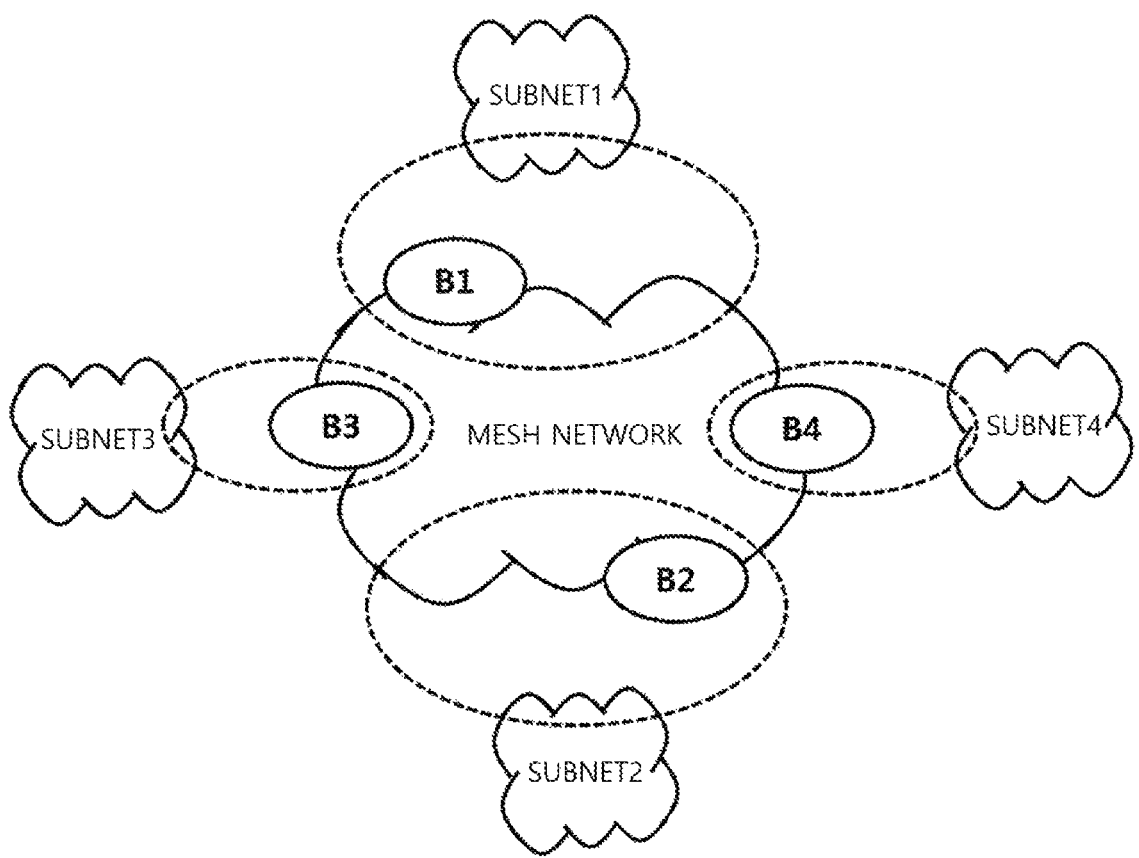
FIG. 1 schematically illustrates a configuration of a wireless mesh network according to an embodiment of the present invention.

In the following detailed description of the present invention, references are made to the accompanying drawings that show, by way of illustration, specific embodiments in which the present invention may be implemented. These embodiments are described in sufficient detail to enable those skilled in the art to implement the present invention. It should be understood that various embodiments of the present invention, although different, are not necessarily mutually exclusive. For example, specific features, structures, and characteristics described herein, in connection with one embodiment, may be implemented within other embodiments without departing from the spirit and scope of the present invention. In addition, it should be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range equivalent to what the claims claim. In the drawings, like reference numbers refer to the same or similar function through many ways.

Hereinafter, embodiments of the present invention will be described with reference to the accompanying drawings, so that those skilled in the art can easily carry out the present invention.

FIG. 1 schematically illustrates a configuration of a wireless mesh network according to an embodiment of the present invention.

Referring to FIG. 1, the wireless mesh network includes a plurality of mesh nodes, and wireless communication routers become mesh nodes and connect all sections by wireless. At this time, each of the mesh nodes transmits data having passed through one or more hops to a neighboring router or a client within a wireless transmission limit.

Some of the mesh nodes serve as bridge nodes B1, B2, B3, and B4 for connecting to an external network, for example, subnet 1, subnet 2, subnet 3, and subnet 4. At this time, the mesh nodes may have, in addition to a client function, a bridge mode function for operating as a bridge node.

Therefore, in the wireless mesh network, the mesh clients may connect to the external network through the bridge node via the mesh node. The mesh clients, for example, may connect to the Internet or receive and transmit data to a specific network.

Figure 2:
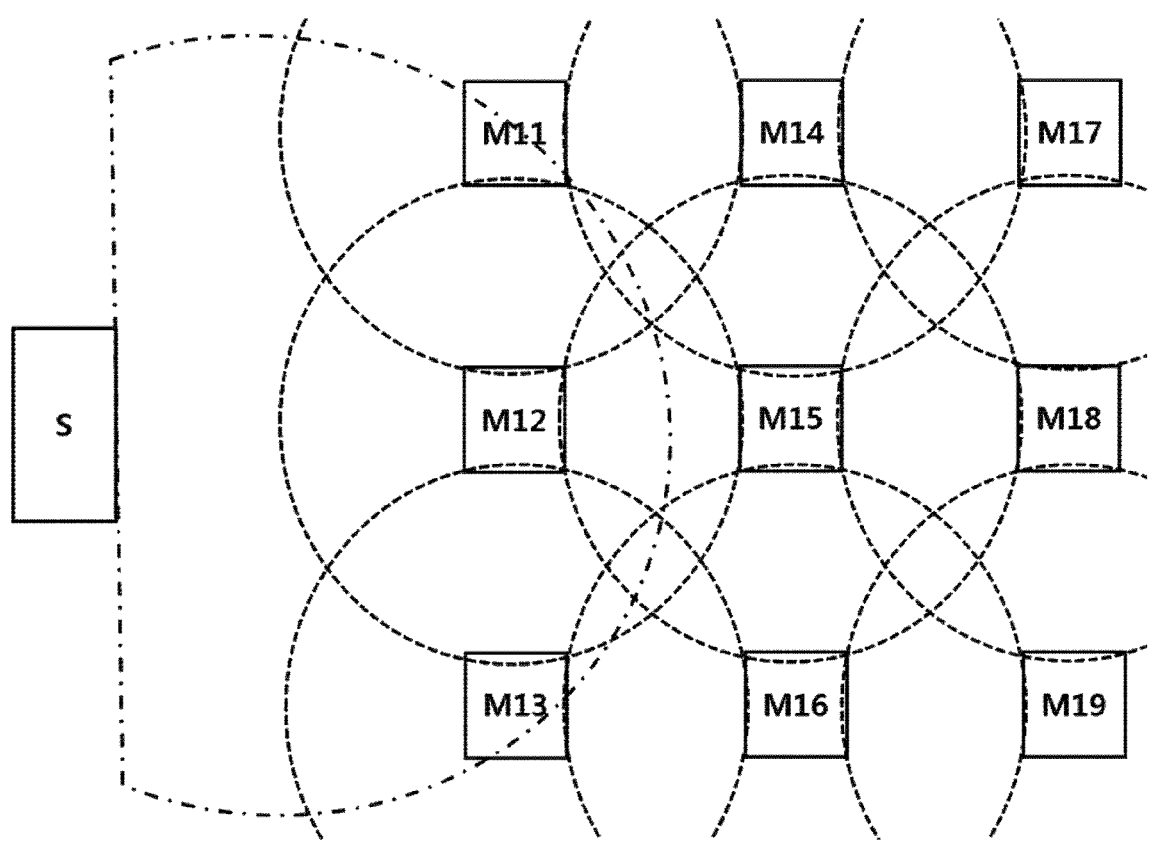
FIG. 2 schematically illustrates a state for describing a method for forming a dynamic bridge node of a wireless mesh network according to an embodiment of the present invention.

The method for forming the dynamic bridge node in the wireless mesh network configured as above will be described in detail with reference to FIG. 2.

First, a plurality of mesh nodes, such as a mesh router and a mesh client, form a wireless mesh network. In this regard, the wireless mesh network may form a low-power/low-loss wireless network environment in such a manner that a wireless communication module to serve as an antenna, e.g., wireless communication routers, becomes a mesh node and wirelessly connects all sections.

A bridge mode of at least one mesh node M11, M12, . . . , M19 among the mesh nodes is enabled. In this case, a location of the mesh node whose bridge mode is enabled may be set to be a specific location for a configuration of efficient communication environment by calculation of mutual coverage on a wireless mesh network in which a routing path optimized for data signal transmission is set.

With this configuration, when a signal corresponding to a connection source S of an external network connectable to the wireless mesh network is received in a state in which the wireless mesh network is formed, the mesh node having the enabled bridge mode transmits rank information for connection to the connection source S, that is, the external network, with reference to the distance to the connection source and the traffic for communication with the mesh node's own external network. The distance to the connection source S may be measured by at least one of a received signal strength intensity/indication (RSSI) method, a time-of-flight (TOF) method, a time-difference-of-flight (TDOF) method, an angle-of-arrival (AOA) method, and a phase-of-arrive (POA) method.

At the same time, the mesh node having the enabled bridge mode receives the rank information transmitted from neighboring mesh nodes having the enabled bridge modes. The mesh node compares the received rank information of the neighboring mesh node with the mesh node's own rank information and generates an order of priority for connection to the external network.

At this time, if the generated order is not a highest order of priority, the mesh node excludes the mesh node itself from the rank for connection to the external network through the connection source S, and if the generated order is the highest order of priority, the mesh node operates as a bridge node for connection of the external network and the wireless mesh network through the connection source S. For example, in order to exclude the mesh node itself from the rank for connection to the connection source S, the mesh node may temporarily stop transmitting an information signal for the enabled bridge mode, or may temporarily transmit an information signal, such as "no rank", as the rank information for connection to the connection source S.

That is, if the bridge node is not installed at a specific location and there is a signal of the connection source of the external network in a state in which a mutual coverage is calculated and a bridge mode of a mesh node located at a position for serving as a bridge node is enabled, one mesh node having a highest order of priority among the mesh nodes having the enabled bridge modes in an area close to the connection source operates as a bridge node. The other neighboring mesh nodes exclude themselves from the rank for connection to the external network, thereby preventing traffic increase due to the communication with the external network. This allows the mesh client to use the external network through the mesh node that operates as the bridge node.

In this manner, since the mesh node located at the specific position operates as the bridge node, preset mesh nodes having enabled bridge modes are rearranged for efficient network configuration. Accordingly, the protocol can be lightened for efficient operation of the communication in the wireless mesh network.

That is, if the mesh nodes having the enabled bridge modes concentrate on a specific region due to the state change of the network according to the connection to the external network through the connection source, traffic for communication with the external network may concentrate on a few bridge nodes in regions other than the specific region, thus causing a transient network deadlock. Therefore, unnecessary bridge modes are disabled in a region in which the mesh nodes having the enabled bridge modes are dense. On the contrary, bridge modes of mesh nodes are additionally enabled in a region in which the mesh nodes having the enabled bridge modes are sparse.

For example, when the mesh node is located in the region in which the mesh nodes having the enabled bridge modes are dense, the mesh node checks the mesh node's own communication state and disables the bridge mode when high traffic for communication with the external network does not occur. In addition, when the mesh nodes having the enabled bridge modes are located in the region in which the mesh nodes having the enabled bridge modes are sparse, the mesh node checks the mesh node's own communication state and enables the bridge mode when high traffic for communication with the external network occurs.

In addition, when the mesh node having the enabled bridge mode is located at a predetermined hop distance previously set with the mesh node, for example, at a 2-hop distance, and traffic for communication with the external network increases at the mesh node having the enabled bridge mode, the mesh node may check the mesh node's own communication state and may enable the bridge mode if the traffic for communication with the external network is less than or equal to a first setting value of a resource, for example, 30%. In this case, the 2-hop distance has been presented as the location of the mesh node having the enabled bridge mode, at which the traffic increases, and this is merely one embodiment. Any location may be used as long as the location is located within a previously set hop distance that is located within the coverage of the mesh node and has a certain distance from the mesh node.

When the bridge mode of at least one of the mesh nodes located at a 1-hop distance from the mesh node is enabled during the enabling of the bridge mode, the mesh node may check the mesh node's own communication state and may disable the bridge mode if the traffic for communication with the external network is less than or equal to a second setting value of a resource, for example, 20%.

While the bridge mode is enabled, the mesh node checks the mesh node's own communication state, and may support the enabling of the bridge mode of at least one of the mesh nodes located at a hop distance previously set with the mesh node itself, for example, at a 2-hop distance when the traffic for communication with the external network is greater than or equal to a third setting value of a resource, for example, 70%.

In this manner, when the mesh node located at a specific location operates as the bridge node to connect the wireless mesh network and the external network, an efficient network operation can be achieved by rearranging the mesh node having the enabled bridge mode on the wireless mesh network.

In this case, the mesh node assigns identification information to neighboring mesh nodes, based on a routing protocol for low-power lossy networks (RPL) rank, a relation index, and a bloom filter value, and stores the assigned identification information as a routing table. The mesh node may confirm the location of the neighboring mesh node with reference to the stored routing table.

Figure 3:
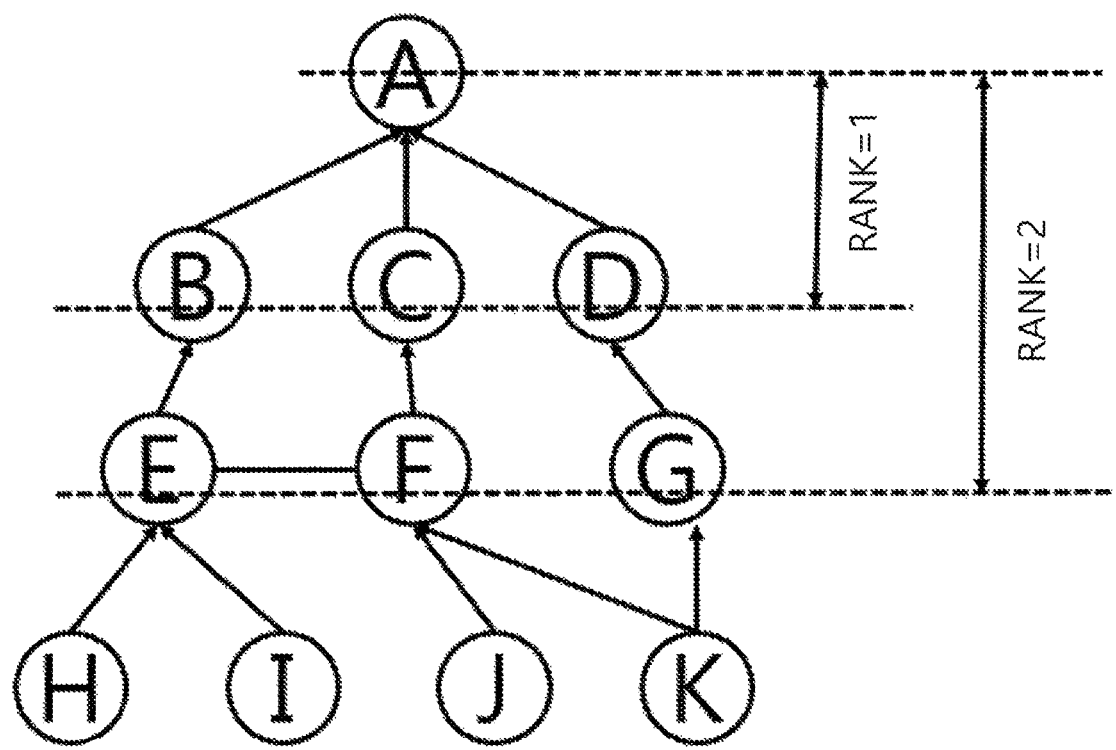
FIG. 3 schematically illustrates a state in which a neighboring mesh node is identified according to the method for forming the dynamic bridge of the wireless mesh network according to an embodiment of the present invention.

That is, as illustrated in FIG. 3, the rank in the RPL is a metric given according to depths of child nodes below from a root node and may be assigned to each node.

For example, since a node E is present at a 2-depth location from a root node A, a rank of the node E is 2. Neighboring nodes are nodes B, F, H, and I, a parent node is a node B, a sibling node is a node F, and a child node is nodes H and I. That is, each node in the RPL has the rank and relative relation information between parent/sibling/child nodes as additional information except for each node's identifier, and a transmitted data signal has information on a source node and a destination node.

Among such additional information, the neighboring nodes may be managed through the routing table by securing a search direction for a destination node in a forward direction and securing information on child nodes, which may be accurately and clearly recognized and managed by each node, in a backward direction.

In addition, since the network in the RPL is based on a graph structure having directionality, the accuracy of the node identification may be increased by using information on the forward direction and the backward direction.

Therefore, simplified identification information may be assigned by using the RPL rank and the index information assigned to the child node by each node. For example, in FIG. 3, the node A may assign child indices of 0, 1, and 2 to the child nodes B, C, and D. In this case, an identification value composed of key(Rank,ChildIndex)–value(BloomFilterValue) may be stored in the routing table of the node A.

In addition, since the node B is located at rank=1 from the node A and the child index 0 is assigned to the node B, the node B has key=(1,0) and value=(bloom filter value). Similarly, the node C may have key=(1, 1) and value=(bloom filter value), and the node D may have key=(1,2) and value=(bloom filter value). That is, in the configuration and management of the routing table, each node within the network may grasp the locations of the neighboring nodes by actively using the directional graph structure of the RPL.

The mesh node may use a bloom filter value so as to confirm whether a specific node is present on a routing path.

In this regard, the mesh node may calculate a hash function value by using an address value in the mesh network and may generate a bloom filter value by substituting "1" for a bit of an index corresponding to the hash function value.

For example, when a bit length of a bloom filter is assumed to be L and there are x different hash functions H1, H2, . . . , Hx having a range of 0 to L–1 as a result value, a result obtained by inputting an identifier of "node a" in the network to each hash function H1, H2, . . . , Hx is processed as a bit index of a bloom filter and "1" is substituted for a value of a corresponding location, thereby generating a bloom filter value of "node a".

For example, when there are two nodes "node a" and "node b" respectively having addresses "2001::25de::cade" and "::C000:0234" in the mesh network and there are hash functions H1, H2, H3, and H4 for generating a bloom filter value of L=16, all digits of which are reset to 0, "0000001110100000" may be generated as the bloom filter value of the "node a" by substituting "1" for bits of tenth, sixth, eighth, and seventh indices of a bloom filter value having a 16-bit length according to a result of H1(2001::25de::cade)=10, H2(2001::25de::cade)=6, H3(2001::25de::cade)=8, and H4(2001::25de::cade)=7. Also, in the same manner as the "node a", a value of "0110110000000000" may be generated as the bloom filter value of the "node b" according to results of the hash functions H1(::C000:0234)=1, H2(::C000:0234)=6, H3(::C000:0234)=5, and H4(::C000:0234)=2.

As described above, the bloom filter value of each mesh node in the mesh network may be used as the identifier for node identification.

Therefore, each mesh node in the mesh network may grasp the locations of the neighboring mesh nodes through the RPL rank, the relation index, and the bloom filter value.

The traffic analysis in the mesh node may be performed by using a cumulative path expected transmission count metric (ETX).

In this case, the cumulative path ETX may be calculated by the product of ETX values between two nodes obtained by coupling all nodes located within the routing path. For example, the cumulative path EXT may be calculated by ETX(Root,A)×ETX(A,B)× . . . ×ETX(X,N).

That is, since one node has directionality having a parent node above the node and a child node below the node, a health condition of an entire path, that is, a traffic condition may be confirmed by calculating and accumulating ETXs, which are data transmission amounts expected between the coupled links according to a direction of data transmission from a source to a destination or root.

Also, the ETX is the result obtained by dividing the number (numTX) of transmitted messages by the number of acknowledges (ACKs) received in response to the transmitted messages. The ETX numTX may be represented by $$ETX = \frac{numTX}{numTX - ack}.$$

A small ETX means that the number of attempts that the corresponding node has made to transmit data is small. When data is transmitted with a node having a small ETX value, more efficient data transmission may be achieved.

In the foregoing descriptions, although the present invention has been described in connection with the specific matters, such as the specific components, the specific embodiments, and the drawings, they are provided only for assisting in the understanding of the present invention, and the present invention is not limited to the embodiments. It will be apparent that those skilled in the art can make various modifications and changes thereto from these descriptions.

Therefore, the spirit of the present invention should not be limited to the aforementioned embodiments, and the appended claims and what are modified equally or equivalently thereto will be considered to fall within the scopes of the present invention.

What is claimed is:

1. A method for forming a dynamic bridge node for connection to an external network in a wireless mesh network configured by a plurality of mesh nodes, the method comprising:

enabling a bridge mode of at least one of the mesh nodes in correspondence to a mutual coverage;

when a signal corresponding to a connection source is received from the external network, transmitting, by the mesh node having the enabled bridge mode, rank information for connection to the external network with reference to a distance to the connection source and the mesh node's own traffic, comparing rank information received from a neighboring mesh node having an enabled bridge mode with the mesh node's own rank information, and generating an order of priority for connection to the external network; and when the generated order of priority is not a highest order of priority, excluding the mesh node from the rank for connection to the external network, and when the generated order of priority is the highest order of priority, operating the mesh node as a bridge node for connection of the external network and the wireless mesh network, wherein when the mesh node is located in a region in which mesh nodes having enabled bridge modes are more than a first predetermined number, the mesh node checks the mesh node's own communication state and disables the bridge mode when more traffic for communication with the external network than a predetermined traffic does not occur, when the mesh node is located in a region in which the mesh nodes having the enabled bridge modes are fewer than a second predetermined number, the mesh node checks the mesh node's own communication state and enables the bridge mode when more traffic for communication with the external network than the predetermined traffic occurs, and when the bridge mode of at least one of the mesh nodes located at a 1-hop distance from the mesh node is enabled during the enabling of the bridge mode, the mesh node checks the mesh node's own communication state and disables the bridge mode when the traffic for communication with the external network is less than or equal to a second setting value of a resource.

2. The method of claim 1, wherein when the mesh node having the enabled bridge mode is located at a predetermined hop distance previously set with the mesh node and traffic for communication with the external network increases at the mesh node having the enabled bridge mode, the mesh node checks the mesh node's own communication state and enables the bridge mode when the traffic for communication with the external network is less than or equal to a first setting value of a resource.

3. The method of claim 1, wherein during the enabling of the bridge mode, the mesh node checks the mesh node's own communication state, and supports the enabling of the bridge mode of at least one of the mesh nodes located at a predetermined hop distance previously set with the mesh node when traffic for communication with the external network is greater than or equal to a third setting value of a resource.

4. The method of claim 1, wherein the mesh node assigns identification information to neighboring mesh nodes, based on a routing protocol for low-power lossy networks (RPL) rank, a relation index, and a bloom filter value, stores the assigned identification information as a routing table, and confirms positions of the neighboring mesh nodes with reference to the stored routing table.

5. The method of claim 1, wherein the distance to the connection source is measured by at least one of a received signal strength intensity/indication (RSSI) method, a time-of-flight (TOF) method, a time-difference-of-flight (TDOF) method, an angle-of-arrival (AOA) method, and a phase-of-arrive (POA) method.

* * * * *